June 18, 1940.  J. D. RYAN  2,205,020
PLASTIC FOR LAMINATED SAFETY GLASS
Filed April 28, 1937

Inventor
JOSEPH D. RYAN.

By Frank Fraser
Attorney

Patented June 18, 1940

2,205,020

UNITED STATES PATENT OFFICE 2,205,020

PLASTIC FOR LAMINATED SAFETY GLASS

Joseph D. Ryan, Toledo, Ohio, assignor to Libbey-Owens-Ford Glass Company, Toledo, Ohio, a corporation of Ohio Application April 28, 1937, Serial No. 139,517

6 Claims. (Cl. 49—92)

The present invention relates to laminated safety glass and more particularly to such a glass made from a synthetic resin plastic plasticized with an aliphatic acid ester of diglycerol. This application corresponds to and is identical with my application Serial No. 68,387, filed March 12, 1936.

Primarily, the invention relates to plasticization of the resinous products formed by the reaction of aldehydes on partially or wholly hydrolyzed polymerized vinyl esters in such a way that the plasticized synthetic resin will, when bonded between glass sheets, offer greater resistance to impact at high, normal and low temperatures than is offered by the cellulosic ester plastics under similar circumstances.

As is well known, it has been the general practice heretofore to employ such cellulosic ester plastics as cellulose nitrate and cellulose acetate plastic in the fabrication of laminated safety glass, and it has been recognized for some time that, broadly speaking, the resistance offered to impact of laminated safety glass made with the cellulosic ester plastic diminishes as the temperature is reduced. Therefore, work has been done on the development of transparent plastics suitable for this art embodying the favorable characteristics of the cellulosic ester plastics but possessing improved resistance to impact at all of the temperatures ordinarily encountered when in use and especially the lower temperatures.

Resinous products formed by the reaction of aldehydes on partially or wholly hydrolyzed polymerized vinyl esters are most prominent in three forms, the differences between the three forms of resin depending in the main upon the particular aldehydes employed. The partially or wholly hydrolyzed polymerized vinyl acetate can be reacted with formaldehyde, resulting in a Formvar type of resin; reacted with acetaldehyde, giving an Alvar type of resin; or reacted with butylaldehyde, giving what is termed a Butylvar type of resin. Incidentally, it will be noted that these products can also be made by simultaneously polymerizing the monomeric vinyl compound and condensing with aldehyde in a hydrolyzing medium, that is, polymerization of the monomeric vinyl compound, hydrolysis of the polymer, and condensation with the aldehyde in these circumstances all take place simultaneously.

While it has been found that these types of resins can be made into satisfactory plastic layers for laminated safety glass consumption, nevertheless this is not so unless proper plasticization is had with a correctly chosen plasticizer. For example, if the Butylvar type of resin is plasticized with dibutyl tartrate or triethyl citrate, both of which are plasticizers for the resin, a laminated sheet made by bonding a layer of such plastic between glass sheets offers no material resistance to impact at the lower temperatures and is far inferior in this regard to laminated safety glass made with cellulose derivative plastics.

To produce a plastic in accordance with the present invention for use in the manufacture of laminated safety glass, the synthetic resin is first prepared by reacting a selected aldehyde on either a partially or wholly hydrolyzed polymerized vinyl ester, vinyl acetate being an example of vinyl ester which can be used. This resinous mass is then plasticized with an aliphatic acid ester of diglycerol. There are a number of aliphatic acid esters of diglycerol, of which are given as examples the diglyceryl tetra-acetate, diglyceryl tetra-propionate, diglyceryl tetra-butyrate, etc.

While the present invention is in no way limited to the exact proportion of plasticizer used, it has been found that with the Formvar plastic, for example, 50 parts of diglyceryl tetra-acetate per 100 parts of the Formvar resin gives a plastic which, when bonded between glass sheets, offers considerable resistance to impact. Tests made on such laminated sheets showed that the laminations supported the impact of a two pound ball freely falling through a distance of twenty-one feet at zero degrees Fahrenheit. At ordinary room temperature, such a lamination supports the two pound ball falling through a distance of more than twenty-one and one-half feet, and at 120° Fahrenheit five and one-half feet.

Since diglyceryl tetra-acetate is not available on the open market, this plasticizer was synthesized in the laboratory by the following procedure:

647 grams of glycerol were placed in a 1 liter round bottom flask carrying a long air condenser and a thermometer immersed in the liquid. The mixture was heated at 290 to 300 degrees for a period of eight hours. In order to separate the diglycerol from this mixture, a fraction was collected boiling from 220 to 250 degrees C. at 6 mm. pressure. The diglycerol so prepared was then acetylated by treatment with acetic anhydride using a small amount of zinc chloride as a catalyst. This reaction is violent and should be carried out by adding the diglycerol to the acetic anhydride bath containing the catalyst drop by drop near the boiling point of the acetic anhydride. After complete addition of the diglycerol, the mixture is refluxed for an hour, then poured into water at a low temperature to prevent hydrolysis. The diglyceryl tetra-acetate is recovered by ether extraction, drying of the extract, removal of the ether by distillation and followed by distillation in vacuum. The diglyceryl tetraacetate boils from 180 to 210 degrees C. at a pressure of 13 mm. The product obtained by this procedure gave excellent results for the purpose outlined in this application.

When glycerol is heated as outlined above, besides diglycerol, triglycerol, tetraglycerol, etc., are formed in smaller amounts. Instead of separating the diglycerol, as outlined above, I found that the mixture of the polyglycerols so formed could be completely acetylated and that the products of the acetylation likewise gave excellent results for the purpose outlined in this application. It should be pointed out that such a mixture, namely, diglyceryl tetra-acetate, triglyceryl pentacetate, and tetraglyceryl hexacetate, should be cheaper than the simple diglyceryl tetra-acetate because of its greater ease of preparation.

The resistance to impact offered at the low temperature as above indicated is considered remarkable. On the other hand, if the glass is designed for a use where resistance to impact at the lower temperatures is of material importance, slightly less plasticizer can be used to give a more balanced break test between the elevated temperatures (110–120 degrees Fahrenheit) and low temperatures such as zero degrees Fahrenheit. In this event, it is suggested that about 45 parts of the plasticizer per 100 parts of the Formvar resin be used.

Referring now to the drawing.

Figure 1:
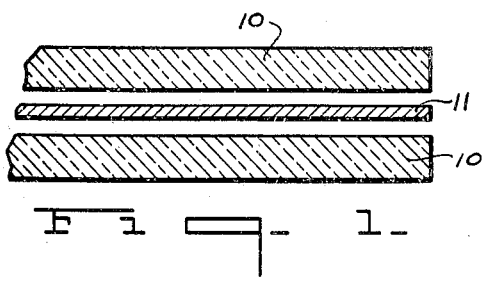
Fig. 1 is a diagrammatic sectional view showing two sheets of glass and a layer of plastic properly arranged prior to lamination.

As shown in Fig. 1, the two sheets of glass 10 have arranged therebetween a layer 11 of the plastic made in accordance with this invention. It has been found that it is not absolutely necessary to employ an adhesive between such a synthetic resin and glass to effect bonding, and therefore in Fig. 1 no adhesive is shown as being used. On the other hand, it will be understood that the invention contemplates the employment of an adhesive.

The layer of plastic 11 is what may be termed a preformed sheet and is produced by plasticizing the synthetic resin material with an aliphatic acid ester of diglycerol, manipulating the mass, and reducing the same to sheet form as is well understood in the plastic making art. For example, the material can be extruded into a sheet form or can be made into a block and then cut into sheets of proper thickness. The customary thickness is about .025 of an inch, but this can be varied as desired.

It is usually preferable to subject the plastic sheeting to a seasoning or curing treatment prior to lamination and this is particularly important if volatile solvents are included in the original batch from which the layer is made. On the other hand, if volatile solvents are not used in preparation of the sheet, it may likewise be desirable to at least subject the sheeting to a temperature and humidity controlled atmosphere prior to bonding to glass to make sure that the water content of the plastic is within satisfactory limits.

Figure 2:
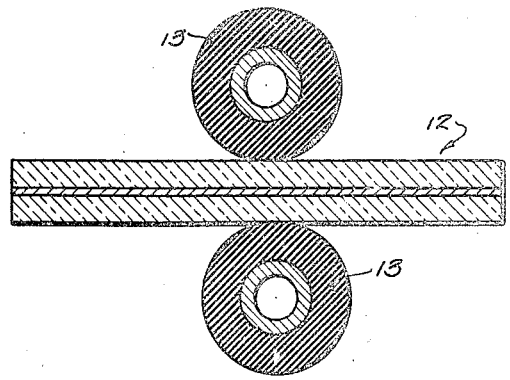
Fig. 2 illustrates the use of a single pair of nipping rollers designed to press the laminations together.

After the properly prepared plastic material has been placed between the glass sheets, it is then ready for pressing, and this may be done in any one of a number of different ways. As an example, the sandwich may be subjected to a two step pressing treatment, and to this end in Fig. 2 the sandwich 12 is shown as being passed between a pair of rubber or other compressible nipping rollers 13. In such a two step pressing system, the nipping rollers are employed to effect preliminary adhesion between the laminations, not only to remove air from between the laminations but to also prepare them for subsequent immersion in an autoclave.

Figure 3:
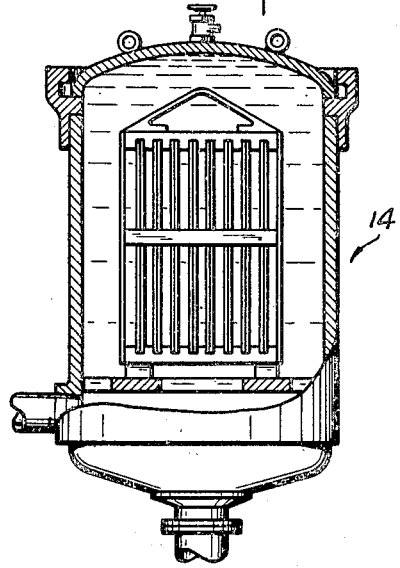
Fig. 3 is a vertical sectional view of an autoclave type of compositing apparatus.

Such an autoclave is disclosed in Fig. 3, wherein a rack of glass sandwiches is arranged within the autoclave 14 where the sandwiches are subjected to fluid pressure and properly controlled temperatures. The autoclave treatment completes compositing of the laminations.

Figure 4:
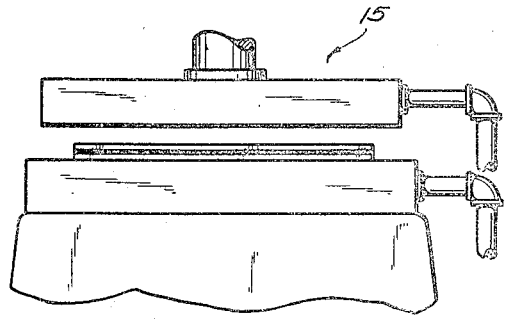
Fig. 4 is a diagrammatic showing of a platen press type of equipment.

Instead of using a two step pressing method, the laminations can be bonded in other ways such as, for example, by use of the platen press 15 shown in Fig. 4.

Figure 5:
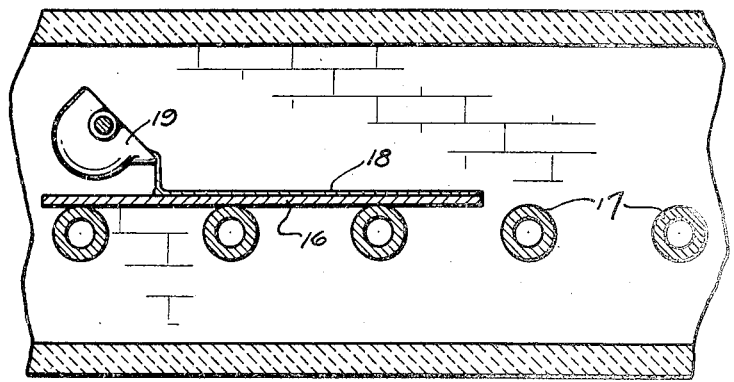
Fig. 5 illustrates the flowing of the plastic material upon the glass sheets in which case a preformed sheet is not required.

In the methods just described, a preformed sheeting is used, but the plastic material does not of necessity have to be reduced to sheet form prior to association with the glass. To the contrary, the plastic mass can be extruded directly upon the glass sheets or flowed thereon as is illustrated in Fig. 5, or applied by means of coating rolls. In Fig. 5 is indicated a receptacle 19 adapted to contain a mass of the resin of such consistency controlled by heat and/or solvents to permit flowing or depositing of the coating 18 upon the sheet of glass 16 supported upon the roller conveyor 17.

If volatile solvents are included in the dope mixture to facilitate flowing upon the glass, it is then of course necessary to remove such volatile solvents, and this may be accomplished by passing the coated glass sheets through a temperature and humidity controlled atmosphere. To permit this, a tunnel structure has been illustrated diagrammatically in Fig. 5.

After two of such sheets of glass have been prepared, they may be placed together with the resin plastic coatings in contact, and then subjected to heat and pressure treatment to effect compositing. It is contemplated that plasticizers or other bond inducing mediums be applied to the exposed coating surfaces if desired to promote an adequate bond between the laminations.

When using such a type of synthetic resin plastic plasticized with aliphatic acid ester of diglycerol, it is not deemed necessary to provide the marginal portions of the composited structure with a weather-proofing seal material. The practice of edge sealing laminated safety glass made with the cellulosic ester plastics is well known and the necessity for which is explained by virtue of the fact that the cellulosic ester plastic or bond between it and the glass is apt to deteriorate if directly exposed to the atmosphere. However, with the present improved plastic, it does not appear that there is any adverse effect upon the plastic or bond between the glass and plastic if exposed directly to the atmosphere.

I claim:

1. Laminated safety glass comprising two sheets of glass and an interposed adherent layer of transparent synthetic resin plastic composed of the resinous product formed by the reaction of an aldehyde on partially or wholly hydrolyzed polymerized vinyl ester plasticized with an aliphatic acid ester of diglycerol.

2. Laminated safety glass comprising two sheets of glass and an interposed adherent layer of transparent synthetic resin plastic composed of the resinous product formed by the reaction of an aldehyde on partially or wholly hydrolyzed polymerized vinyl ester plasticized with an aliphatic acid ester of diglycerol in the approximate proportions of 45 to 50 parts by weight of aliphatic acid ester of diglycerol to 100 parts by weight of resinous product.

3. Laminated safety glass comprising two sheets of glass and an interposed adherent layer of transparent synthetic resin plastic composed of the resinous product formed by the reaction of an aldehyde on partially or wholly hydrolyzed polymerized vinyl ester plasticized with diglyceryl tetra-acetate.

4. Laminated safety glass comprising two sheets of glass and an interposed adherent layer of transparent synthetic resin plastic composed of the resinous product formed by the reaction of formaldehyde on partially or wholly hydrolyzed polymerized vinyl ester plasticized with an aliphatic acid ester of diglycerol.

5. Laminated safety glass comprising two sheets of glass and an interposed adherent layer of transparent synthetic resin plastic composed of the resinous product formed by the reaction of butylaldehyde on partially or wholly hydrolyzed polymerized vinyl ester plasticized with an aliphatic acid ester of diglycerol.

6. Laminated safety glass comprising two sheets of glass and an interposed adherent layer of transparent synthetic resin plastic composed of the resinous product formed by the reaction of acetaldehyde on partially or wholly hydrolyzed polymerized vinyl ester plasticized with an aliphatic acid ester of diglycerol.

JOSEPH D. RYAN.